United States Patent
Ruch et al.

(10) Patent No.: US 8,298,301 B2
(45) Date of Patent: Oct. 30, 2012

(54) METHOD AND DEVICE FOR PRODUCING A MAINTENANCE-FREE BATTERY HAVING A FIXED ELECTROLYTE

(75) Inventors: Jean Ruch, Brilon (DE); Dirk Schröder, Meschede (DE); Albert Schulte, Brilon (DE)

(73) Assignee: HOPPECKE Batterien GmbH & Co. KG, Brilon (DE)

( * ) Notice: Subject to any disclaimer, the term of this patent is extended or adjusted under 35 U.S.C. 154(b) by 1335 days.

(21) Appl. No.: 11/575,155

(22) PCT Filed: Sep. 3, 2005

(86) PCT No.: PCT/EP2005/009480
§ 371 (c)(1),
(2), (4) Date: Oct. 4, 2007

(87) PCT Pub. No.: WO2006/029730
PCT Pub. Date: Mar. 23, 2006

(65) Prior Publication Data
US 2008/0016680 A1    Jan. 24, 2008

(30) Foreign Application Priority Data
Sep. 16, 2004    (EP) ................................ 04021984

(51) Int. Cl.
*H01M 4/82* (2006.01)
*H01M 10/12* (2006.01)
*H01M 10/14* (2006.01)

(52) U.S. Cl. .......................... 29/623.1; 29/730

(58) Field of Classification Search .......... 429/300–313, 429/72, 75, 95, 89, 87, 90, 77–79, 80–82; 29/623.1, 730, 623.2, 623.5; 141/59, 35, 141/32, 1.1, 31, 127; 137/14, 260, 261, 263, 137/265, 268, 883, 861
See application file for complete search history.

(56) References Cited

U.S. PATENT DOCUMENTS

| | | | |
|---|---|---|---|
| 3,402,077 A | 9/1968 | Katuhiko et al. | |
| 3,753,785 A * | 8/1973 | Oswald | 320/147 |
| 4,317,872 A | 3/1982 | Varma | |
| 4,359,075 A | 11/1982 | Eberle et al. | |
| 4,414,302 A | 11/1983 | Jache et al. | |
| 4,687,718 A | 8/1987 | Chiacchio et al. | |
| 5,338,596 A | 8/1994 | Bechtold et al. | |
| 5,376,479 A * | 12/1994 | Gerner | 429/204 |
| 2003/0157400 A1 | 8/2003 | Muneret | |
| 2005/0084762 A1* | 4/2005 | Vaccaro et al. | 429/302 |

FOREIGN PATENT DOCUMENTS

| | | |
|---|---|---|
| DE | 197 57 481 A1 | 7/1999 |
| EP | 0491150 A | 6/1992 |
| EP | 0491150 A2 * | 6/1992 |
| EP | 1317006 | 6/2003 |
| GB | 1364438 | 8/1974 |
| JP | 07220717 A * | 8/1995 |
| JP | 2000123859 A | 9/2000 |

OTHER PUBLICATIONS

Machine Translation and Abstract in English of JP 07-220717.*
Machine Translation in English of EP 0 491 150.*
Machine Translation of EP 1317006 in English.*

* cited by examiner

*Primary Examiner* — Raymond Alejandro
*Assistant Examiner* — Claire L Roe
(74) *Attorney, Agent, or Firm* — Gottlieb, Rackman & Reisman, P.C.

(57) ABSTRACT

The invention relates to a method and a device for producing an accumulator having a fixed electrolyte. The inventive method is characterized by introducing an electrolyte in a flowable form into the accumulator cell and fixing the electrolyte and forming the active mass simultaneously inside the accumulator cell. The device for carrying out the inventive method comprises a filler head (1), an acid reservoir (3), a thickener reservoir (4), a metering pump for the acid (6.1+6.2), a metering pump for the thickener (5.1+5.2) and a flowmeter for the thickener (9.1+9.2) and the acid (10.1+10.2).

5 Claims, 3 Drawing Sheets

METHOD AND DEVICE FOR PRODUCING A MAINTENANCE-FREE BATTERY HAVING A FIXED ELECTROLYTE

The invention relates to a method and a device for producing an accumulator having a fixed electrolyte.

Accumulators having fixed electrolytes have been known since the fifties. The advantage of such battery types resides in their ease of maintenance and their safety regarding the leakage of the electrolyte in the accumulator cells. For fixing the electrolyte it is known to bind the same in the form of a gel or to fix it in the accumulator cells with the aid of a microstructured non-woven material.

One example of the gel-fixed accumulators known from prior art are lead-gel accumulators wherein the electrolyte, normally sulfuric acid, is fixed in the form of a gel that is prepared on the basis of silicon dioxide. From prior art as disclosed by the U.S. Pat. No. 4,317,872 it is known up to present to produce the electrolyte gel batch by batch on the basis of a dispersion from an acid and a thickener and to introduce it into the accumulator cells. However, this batch production of the electrolyte gel frequently leads to quality variations of the gel and finally also to quality variations in the accumulators produced.

In addition, the acid/dispersion mixture must be cooled for decelerating the reaction. The plates must be formed. From German patent DE 197 57 481 it is known to pre-mix and fill in a dispersion from water, thickener and preferably boric acid for reaction deceleration. Inside the accumulator the sulfuric acid is in the active mass of the discharged plates. The thickening is effected by charging.

The laid-open U.S. patent application 2003/0157400 A1 discloses an apparatus for filling lead accumulators in which the gel components are continuously mixed during the filling of the battery, whereby quality variations of the batch-by-batch production of the electrolyte gel are overcome.

A further problem at the production of accumulators having fixed electrolytes is the formation of cracks and pores during the forming process of the active mass inside the accumulator cells, i.e. during the initial charging of the accumulators. The reactions taking place at the electrodes (in the case of the lead accumulator at the negative electrode the conversion of Pb to $PbSO_4$, at the negative electrode the conversion of $PbO_2$ to $PbSO_4$ or the corresponding back reactions) can lead to cracks and pores in the gelled electrolyte. Although an improved transport of gases (transport of oxygen) is made possible thereby inside the accumulator cells, the cracks in the direct environment of the active mass will lead to increased cell resistances due to a worse contacting between the active mass and the gel and accordingly to an adverse effect on the accumulator performance.

The problem of the present invention is the provision of a method which is suitable for overcoming the difficulty of fluctuations in quality of the electrolyte at the batch-by-batch production of gel electrolytes and also the disadvantages occurring due to the formation of the active masses inside the gel accumulators, taking prior art into account.

This problem is solved by a method for producing an accumulator having a fixed electrolyte, characterized by introducing an electrolyte in a flowable form into the accumulator cell and fixing the electrolyte and forming the active mass simultaneously inside the accumulator cell and by a device for carrying out the inventive method which comprises a filler head (1), an acid reservoir (3), a thickener reservoir (4), a metering pump for the acid (6.1+6.2), a metering pump for the thickener (9.1+9.2) and the acid (10.1+10.2).

According to the invention the electrolyte is fixed inside the accumulator cell in the form of a gel. The gel is introduced into the accumulator cell from a thickener and an acid. The thickener and the acid, for instance a colloidal aqueous silicon dioxide solution and sulfuric acid are mixed only at the time of the introduction into the accumulator cell. Simultaneously with the introduction of the sol into the accumulator cell a voltage is applied to the accumulator cell which is suitable for forming active masses inside the cells.

The advantages of the inventive method result from the fact that on one side reformed plates can be used and that on the other side the sol/gel mixture is prepared shortly before the filling and is filled in within the reaction time. This results in considerable simplifications of the method and economies thereof for instance through the abandonment of cooling, agitation, pre-forming. The method can be carried out at room temperature.

By proceeding according to the invention the mobility of the sulfuric acid is reduced, resulting in that the heat development is made uniform, so that other than known from prior art temperature peaks cannot negatively influence other components.

Further advantages and features of the invention will become apparent from the following description of the drawing figures and the illustrated embodiment.

Figure 1:
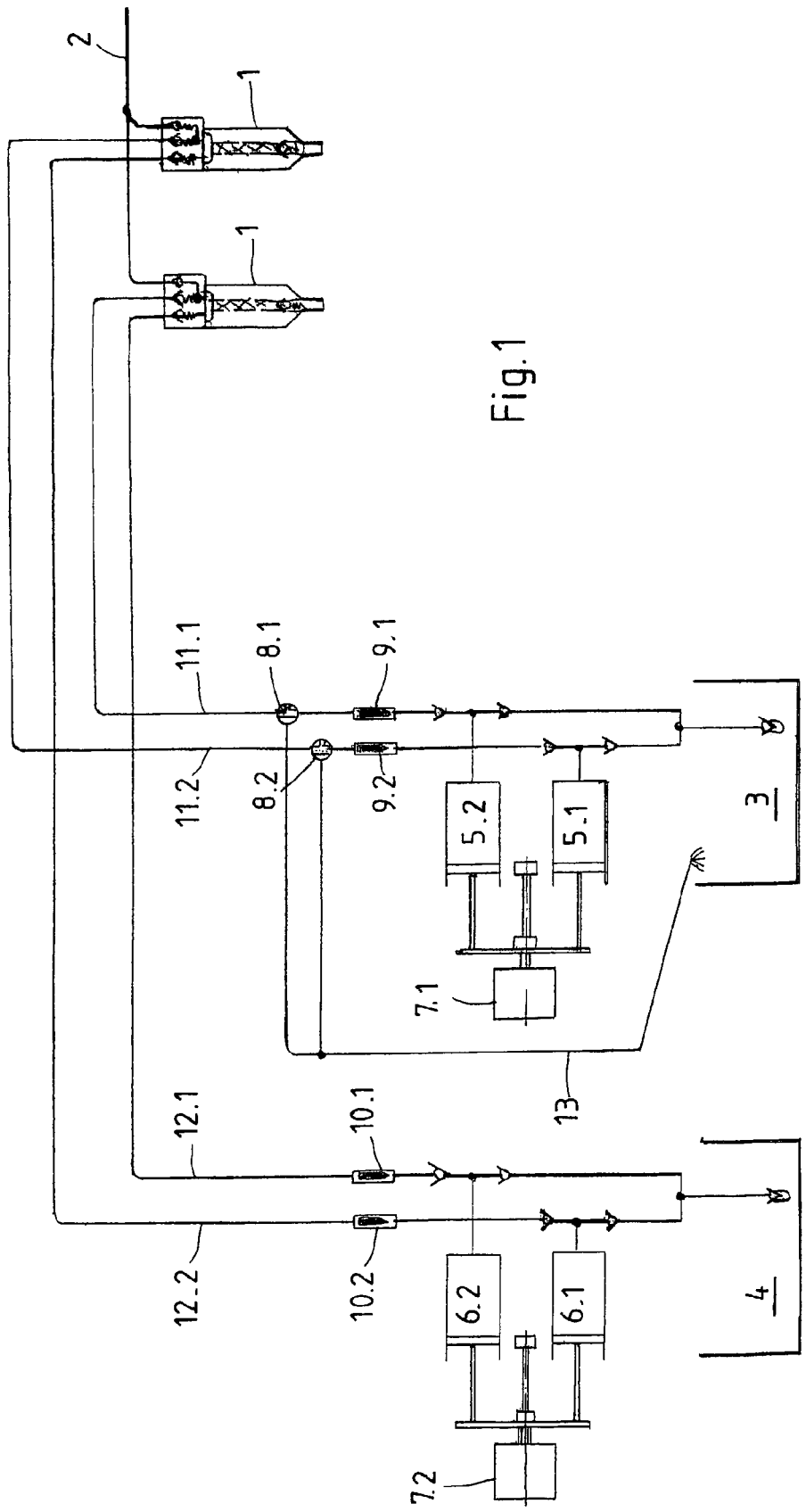
FIG. 1 shows a schematic structure of the device according to the invention.

The inventive device for carrying out this method includes in addition to corresponding electrical connectors and suitable voltage sources for applying the required forming voltage a filler head (1) which includes at least one inlet (19) each for the thickener, the acid and a washing medium. Moreover, the filler head (1) includes a mixing device (20) for the static mixing of at least the thickener with the acid. The filler head further includes a filling finger (21) which is advantageously adapted to the accumulator cell to be filled and which is mounted in an exchangeable manner on the filler head for flexibility of the filler head. The device also includes a flow meter for the thickener and the acid that is used, with the aid of which exactly predetermined mixing ratios can be prepared by means of a control unit.

Additionally, the device includes on the filler head a supply passage for a washing medium (2), with the aid of which thickener residues present in the passages (11.1+11.2) leading to the thickener can be washed back to the thickener reservoir (3) via three-way valves (8.1+8.2) through a back washing passage (13). Advantageously, pressurized air serves as a washing medium.

The device according to the invention includes metering pumps for the thickener (5.1+5.2) and the acid (6.1+6.2). Advantageously, these metering pumps are operated by means of stepping motors (7.1+7.2). However, any other driving device is suitable as well, provided that it guarantees fine and exact metering of the components to be mixed.

By the continuous mixing of the gel components inside the filler head at the time of introducing the gel into the accumulator in the form of a sol and by the mixing ratios that can be finely adjusted by the metering pumps the fluctuations in quality of the electrolyte known in connection with the batch-by-batch mixing of the electrolyte are overcome. By the simultaneous filling of the accumulator with the electrolyte gel or sol and the forming of the active masses inside the cells the disadvantages of the gel accumulators known from prior art are overcome.

Figure 2:
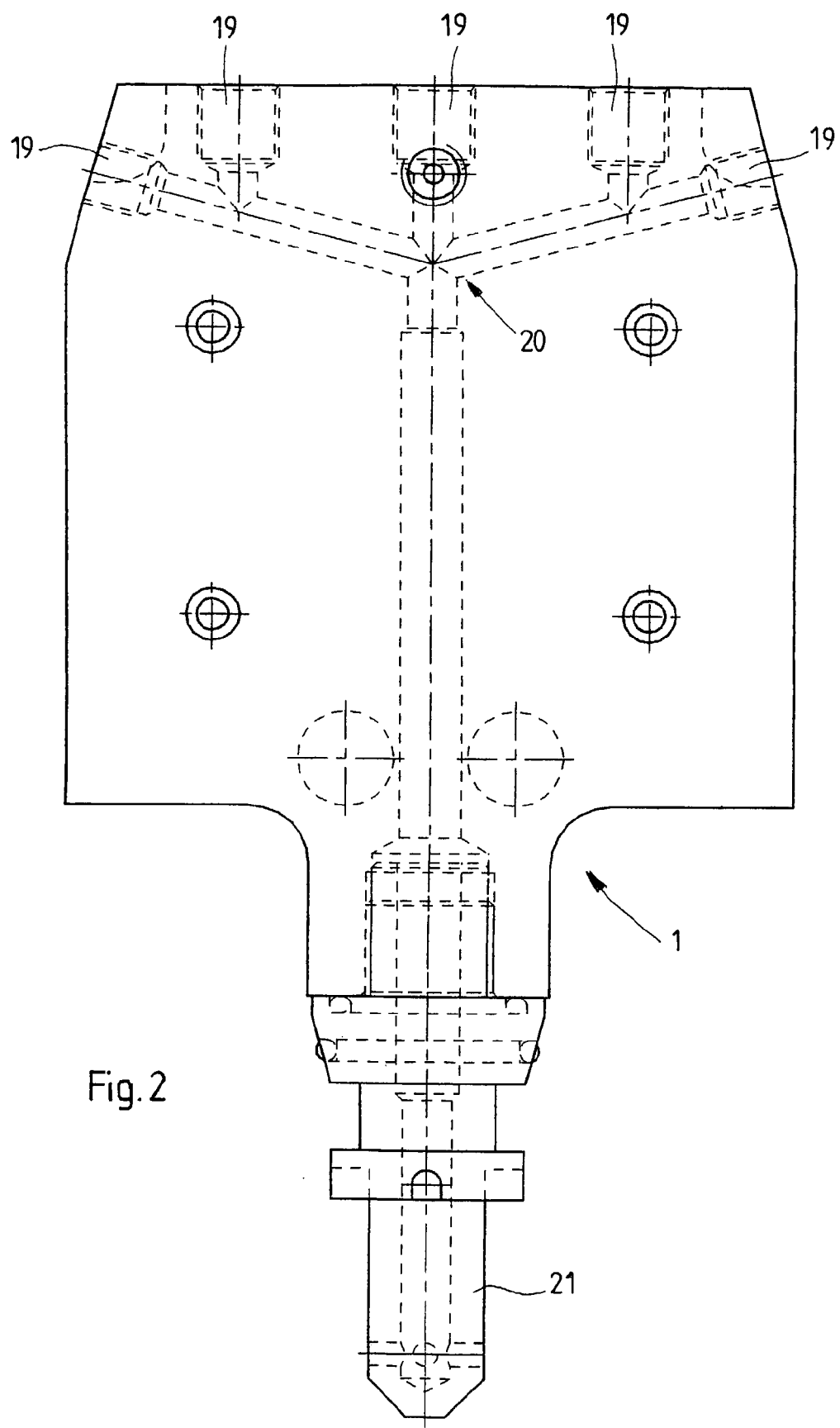
FIG. 2 shows the structure of the filler head (1) according to the invention.

Advantageously, a device for carrying out the inventive method includes a filler head (1) like for instance the filler head illustrated in FIG. 2. The filler head includes at least one inlet (19) each for the gel components and the washing medium. In addition, a filler head according to the invention includes a static mixing device (20) in which the gel components are mixed prior to being introduced into the accumulator.

For filling the electrolyte sol in the accumulator the filler head (1) according to the invention has a filling finger (21) which is adapted advantageously to the accumulator to be filled or to the geometry of the fill opening of the accumulator. Advantageously, the filling finger (21) is mounted in an exchangeable manner to the filler head (1), so that by means of different filling fingers (21) one filler head (1) can be used for different accumulator types.

Figure 3:
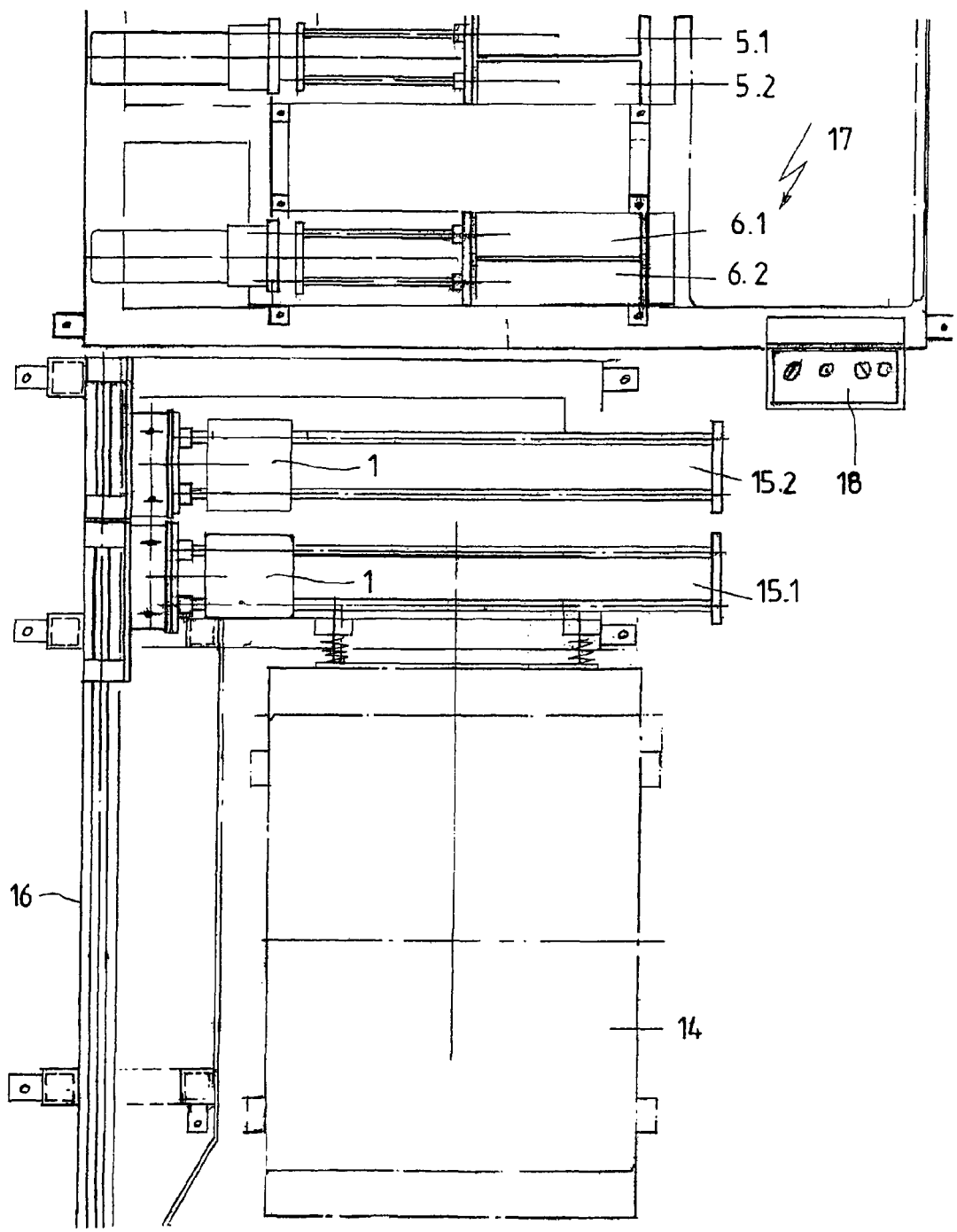
FIG. 3 shows the device according to the invention for filling a plurality of accumulators.

FIG. 3 shows an inventive device for filling a plurality of accumulators. The inventive device includes a seat (14) for the accumulators to be filled, positioning devices (15.1+15.2) for the inventive filler heads (1) as well as a metering unit having metering pumps (5.1+5.2) for the thickener and metering pumps (6.1+6.2) for the acid.

The positioning devices (15.1+15.2) for the filler heads (1) are mounted for displacement along a guide (16), so that the filler heads can be freely moved above the seat (14) for the accumulators to be filled. Alternatively, the seat (14) for the accumulators to be filled can be designed as a movable XY table, whereas the filler heads (1) are stationary. A further alternative for positioning the filler heads (1) is the use of a six-axes articulated robot or other handling devices.

For controlling the device according to the invention includes a control box (17) and a control console (18).

LIST OF REFERENCE NUMBERS

1 filler head
2 passage for washing medium
3 thickener reservoir
4 acid reservoir
5.1/5.2 thickener metering pump
6.1/6.2 acid metering pump
7.1/7.2 stepping motors
8.1/8.2 three-way valve
9.1/9.2 thickener flow meter
10.1/10.2 acid flow meter
11.1/11.2 thickener passage
12.1/12.2 acid passage
13 back washing passage
14 seat for the accumulators to be filled
15.1/15.2 positioning device with filler head
16 slide rail for positioning device
17 control box
18 control console
19 inlets
20 mixing device
21 filling finger

The invention claimed is:

1. Method for producing an accumulator cell having a fixed electrolyte, wherein the electrolyte is introduced in a flowable form into the accumulator cell and wherein the fixing of the electrolyte and the forming of an active mass inside the accumulator cell are effected simultaneously, wherein the electrolyte is introduced into the accumulator cell in the form of a sol mixture, and is then fixed in the accumulator cell in the form of a gel, characterized in that the gel is prepared from at least one sol and one acid, whereby at least a thickener and the acid are mixed only at the time of their introduction into the accumulator cell, whereby simultaneously with the introduction of the sol into the accumulator cell a voltage is applied to the accumulator cell which forms active masses.

2. Method according to claim 1, characterized in that the accumulator cell is a lead-gel accumulator cell having a silicon dioxide/sulfuric acid electrolyte.

3. Method according to claim 2, characterized in that the silicon dioxide is used in the form of a colloidal aqueous solution.

4. Device for carrying out the method as in any one of claims 2 or 3, which device includes a filler head (1), an acid reservoir (3), a thickener reservoir (4), a metering pump for an acid (6.1+6.2), a metering pump for the a thickener (5.1+5.2) as well as flow meters for a thickener (9.1+9.2) and for an acid (10.1+10.2), a seat for the accumulator cell (14) to be filled and a positioning device for positioning a filler head (1) and the accumulator cell to be filled relative to each other, wherein the positioning device is formed by two mutually orthogonal guide elements, by means of which the filler head (1) is freely movable.

5. A filler head for carrying out the method as in any one of claims 2 or 3, including at least one inlet (19) each for a thickener, an acid and a washing medium, a mixing device (20) for the static mixing of at least the thickener with the acid, as well as a different filling fingers (21) for introducing into the accumulator cell a mixed sol consisting of thickener and acid, wherein the different filling fingers are adapted to the accumulator cell to be filled.

* * * * *